United States Patent [19]

Bell

[11] Patent Number: 5,298,471
[45] Date of Patent: Mar. 29, 1994

[54] PURE TUNGSTEN OXYPHENOLATE COMPLEXES AS DCPD POLYMERIZATION CATALYSTS

[75] Inventor: Andrew Bell, West Grove, Pa.

[73] Assignee: Hercules Incorporated, Wilmington, Del.

[21] Appl. No.: 979,696

[22] Filed: Nov. 20, 1992

Related U.S. Application Data

[63] Continuation of Ser. No. 780,693, Oct. 18, 1991, abandoned, which is a continuation of Ser. No. 596,265, Oct. 12, 1990, Pat. No. 5,082,909.

[51] Int. Cl.$^5$ ............................................. B01J 31/00
[52] U.S. Cl. ................................. 502/167; 502/168; 502/171; 556/57
[58] Field of Search ............... 502/167, 168, 171; 556/57

[56] References Cited

U.S. PATENT DOCUMENTS

| | | | |
|---|---|---|---|
| 4,239,874 | 12/1980 | Ofstead et al. | 526/143 |
| 4,550,216 | 10/1985 | Basset et al. | 585/645 |
| 4,727,125 | 2/1988 | Nelson | 526/281 |
| 4,729,976 | 3/1988 | Sjardijn et al. | 502/102 |
| 4,810,762 | 3/1989 | Sjardijn et al. | 526/166 |
| 4,861,848 | 8/1989 | Bassett et al. | 526/169 |
| 4,994,426 | 2/1991 | Sjardijn et al. | 502/158 |
| 5,028,672 | 7/1991 | Sjardijn et al. | 526/128 |
| 5,071,812 | 12/1991 | Kelsey | 502/164 |
| 5,081,208 | 1/1992 | Sjardijn | 526/166 |
| 5,093,441 | 3/1992 | Sjardijn et al. | 526/126 |
| 5,095,082 | 3/1992 | Kelsey | 526/282 |

FOREIGN PATENT DOCUMENTS

| | | |
|---|---|---|
| 266587 | 5/1988 | European Pat. Off. |
| 294620 | 12/1988 | European Pat. Off. |
| 360262 | 3/1990 | European Pat. Off. |
| 374997 | 6/1990 | European Pat. Off. |
| 376198 | 7/1990 | European Pat. Off. |
| 376199 | 7/1990 | European Pat. Off. |

*Primary Examiner*—Patrick P. Garvin
*Assistant Examiner*—Brent M. Peebles
*Attorney, Agent, or Firm*—Joanne W. Patterson

[57] ABSTRACT

This invention relates to a two component catalyst system for polymerization of metathesis polymerizable cycloolefins, comprising
(a) a tungsten compound of the formula $WOX_{4-x}(OAr)_x$ wherein x represents chlorine, bromine or fluorine, Ar represents a hindered phenyl ring having 1-5 substituents and x=1, 2, or 3; and
(b) an activator compound.

Among the preferred molecules or groups that are substituted on the phenyl ring of the tungsten compound are chlorine, bromine, phenyl, methoxy and isopropyl groups. Ar can also represent a multisubstituted phenyl group such as 2,4-dichloro-6-methylphenyl.

17 Claims, No Drawings

PURE TUNGSTEN OXYPHENOLATE COMPLEXES AS DCPD POLYMERIZATION CATALYSTS

This application is a continuation of application Ser. No. 07/780,693 filed Oct. 18, 1991 now abandoned, which is a continuation-in-part of application Ser. No. 07/596,265, Oct. 12, 1990, now U.S. Pat. No. 5,082,909.

FIELD OF THE INVENTION

This invention is a process for the bulk polymerization of metathesis polymerizable cycloolefins, especially dicyclopentadiene, the polymer prepared by this process and the catalyst system used in the process.

BACKGROUND OF THE INVENTION

Preparation of thermoset cycloolefin polymers via metathesis catalysts is a relatively recent development in the polymer art. Klosiewicz, in U.S. Pat. Nos. 4,400,340 and 4,520,181, teaches preparation of such polymers from dicyclopentadiene and other similar cycloolefins via a two-stream reaction injection molding technique wherein a first stream, including the catalyst, and a second stream, including a catalyst activator, are combined in a mix head and immediately injected into a mold where, within a matter of seconds, polymerization and molding to a permanently fixed shape take place simultaneously.

In the typical system, according to Klosiewicz, the catalyst component is a tungsten or molybdenum halide and the activator is an alkyl aluminum compound. Most strained ring non conjugated polycyclic cycloolefins are metathesis polymerizable. These include, for example, dicyclopentadiene, higher order cyclopentadiene oligomers, norbornene, norbornadiene, 4-alkylidene norbornenes, dimethanooctahydronaphthalene, dimethanohexahydronaphthalene and substituted derivatives of these compounds, such as 5-vinyl 2 norbornene, 5 ethylidene-2-norbornene, 5-methyl-2 norbornene, 5 phenyl-2 norbornene, ethylidenetetracyclododecane, methyltetracyclododecane, 5,6-dimethyl-2 norbornene, 5 ethyl 2-norbornene, 5 butyl-2-norbornene, 5 hexyl-2 norbornene, 5 octylnorbornene, 5-dodecyl-2-norbornene, tetracyclododecane, hexacycloheptadecene, methyltetracyclododecene and ethylidenetetracyclododecene. The preferred cycloolefin monomer is dicyclopentadiene or a mixture of dicyclopentadiene with other strained ring hydrocarbons in ratios of 1 to 99 mole % of either monomer, preferably about 75 to 99 mole % dicyclopentadiene.

The metathesis catalyst system is comprised of two parts, i.e., a catalyst component and an activator. The preferred catalyst component as taught by Klosiewicz has been a tungsten halide, and preferably a mixture or complex of tungsten hexachloride ($WCl_6$) and tungsten oxytetrachloride ($WOCl_4$).

The tungsten or molybdenum compound of Klosiewicz is not normally soluble in the cycloolefin, but can be solubilized by complexing it with a phenolic compound.

In U.S. Pat. No. 4,981,931, by Bell, was disclosed tungsten catalyst compositions for metathesis polymerization comprising

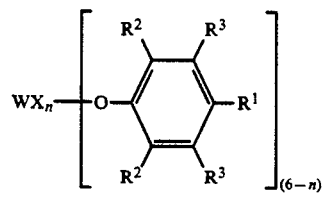

where X is Cl or Br, n is 2 or 3, $R^1$ is a H, a Cl, an alkyl group having 1-10 carbons, an alkoxy group having 1 to 8 carbons, or a phenyl group, $R^2$ is H or an alkyl group having 1 to 9 carbon atoms and $R^3$ is a H or an alkyl group having 1 to 10 carbon atoms for use with a trialkyltin hydride or a triphenyltin hydride activator. A process to employ such tin activator compounds in a system in which gelatin and polymerization were delayed for at least a time sufficient to charge the reaction mixture to a mold. Both the catalyst and activator compounds had improved stability, with resistance to oxygen and moisture. The catalyst compounds were easy to isolate, instead of being mixtures as are those found in the prior art. Although certain advantages were found, these compounds when used to polymerize strained ring cycloolefins produced polymers with a higher than desired residual monomer level.

It is therefore an object of this invention to provide a catalyst composition that polymerizes strained ring polycyclic cycloolefins that have very low levels of residual monomer.

There is also a need for polymers of the type described by Klosiewicz to have higher levels of heat resistance, while maintaining other properties, such as impact and tensile strengths at levels similar to those found in prior art strained ring cycloolefin polymers. Previously, improved heat resistance was obtained through use of comonomers with the dicyclopentadiene (DCPD) monomer. The improved heat resistance was previously obtained at the cost of decreased impact resistance. Therefore it is a further object of this invention to provide catalyst compositions that polymerize strained ring polycyclic cycloolefins producing polymers with a higher level of heat resistance than prior art polymers while maintaining their impact strength.

Another object of this invention is to find catalysts that are more efficient in polymerizing dicyclopentadiene.

This invention is a process for preparing a polymer which comprises contacting a strained ring polycyclic polyolefin with a substantially pure tungsten complex, having the formula $WOX_{4-x}(OAr)_x$ wherein X represents a halogen selected from the group consisting of bromine, chlorine and fluorine; OAr represents a mono, di-, tri-, tetra- or penta- substituted phenoxy group and where x is 1, 2 or 3. In the preferred embodiments of this invention, X is chlorine. These catalysts are efficient and promote catalysis of dicyclopentadiene at catalyst concentration levels of 1 part catalyst to 4000 parts monomer or less.

Various activator compounds may be employed as are known in the art to act together with the tungsten catalyst complexes described above to cause the polymerization of strained ring 25 polycyclic cycloolefins. Among the activator compounds that can be employed in the practice of this invention are trialkyltin hydrides, triaryltin hydrides, alkylaluminum compounds, alkylalkoxyaluminum halides, diethylaluminum chloride, diethylzinc, dibutylzinc, and triethylsilane. Mixtures of two or more activator compounds may produce more desirable polymerization conditions and more desirable polymer properties than a single activator compound in certain situations.

Of the trialkyltin hydrides, suitable for use in the process of the invention, tri-n-butyltin hydride is preferred. Among the triaryltin hydrides is triphenyltin hydride.

As stated already hereinbefore the DCPD monomer used herein was of highly pure grade, containing less than 2% impurities. The DCPD used in the following examples was about 98–99% pure monomer. Other monomers or comonomers employed in the practice of this invention should also be of about this degree of purity. However, it is also contemplated that the polymerization feed compositions of this invention can polymerize less pure grades of dicyclopentadiene when the appropriate tungsten catalyst compound, activator compound and other components are employed.

When the two parts of the catalyst system, the tungsten catalyst and the tin activator, are combined, the resulting cycloolefin (for example, DCPD) to catalyst compound ratio will be from about 500:1 to about 15,000:1 on a molar basis, preferably 2000:1 and the molar ratio of the tungsten complex versus the tin activator compound will be from about 1:2 to 1:6.

Generally the polymerization takes place in bulk, but the catalyst components may be dissolved in a small amount of solvent, such as toluene. It is preferred, however, to use DCPD as a solvent. When the liquid tri-n butyltin hydride activator compound is used, no solvent is necessary for its addition and triphenyltin hydride is readily soluble in DCPD.

A preferred method in the practice of this invention for the polymerization of DCPD is to contact a tungsten compound catalyst containing component stream with a tin compound activator-containing component stream wherein at least one of the streams contains the DCPD. For example, it is possible to dissolve the tungsten catalyst in DCPD and either to dissolve the activator in DCPD or in another solvent or to use the activator without any solvent. Usually both the tungsten catalyst and the tin activator are first dissolved in separate streams of DCPD prior to the mixture of said streams.

After the streams have contacted with each other the resulting mixture may be injected or poured into a mold, where the polymerization takes place. The polymerization is exothermic, but heating the mold from about 50° to 100° C. is preferred.

The $WOX_{4-x}(OAr)_x$ complexes do not require any added solvent in order that they may become soluble in DCPD solution. In general, the solutions are quite stable in DCPD. The solutions can be used immediately, or within 48 hours, in the polymerization of DCPD with a suitable activator. When the tungsten complexes are stored in dicyclopentadiene/2 methoxyethyl ether (diglyme) solution (storage up to four weeks at 40° C.) the viscosity of the component remained constant. No difference in reactivity has been observed for solutions with added diglyme compared with those which possess no such additive. The stability of the solutions can also be improved to eight weeks, and beyond, by addition of an antioxidant, such as 2,6 di-tert butyl-4 methylphenol. Monitoring of the tungsten-phenoxide species in solution by electrochemical measurements, e.g., cyclic voltammetry, demonstrated that the integrity of the tungsten component is maintained during storage.

During the polymerization of DCPD various additives can be included in the reaction mixture to modify the properties of the polymer product of the invention. Possible additives include fillers, pigments, antioxidants, light stabilizers, plasticizers and polymeric modifiers.

The invention further relates to a two component catalyst system in which the first component is a tungsten compound of the formula $WOX_{4-x}(OAr)_x$, wherein x is 1, 2 or 3; X is F, Cl or Br and wherein Ar represents a phenyl ring substituted with one or more of the following substituents: hydrogen (H), bromo (Br), chloro (Cl), fluoro (F), iodo (I), nitro ($NO_2$), cyano (CN), aldehyde (CHO), carboxy (COOH), hydroxymethyl ($CH_2OH$), alkoxy (OR), alkylthio (SR), arylthio (SAr), acyl (COR), aroyl (COAr), acyloxy (OCOR), alkoxycarbonyl (COOR), cycloalkanes (cyclo-R), dialkylamino ($NR_2$), diarylamino ($NAr_2$), alkylsulfonyl ($SO_2R$), arylsulfonyl ($SO_2Ar$), alkylsulfonate ($SO_2OR$), arylsulfonate ($SO_2OAr$), aryl (Ar), aralkyl ($CH_2Ar$), aryloxy (OAr), alkyl groups containing 1–20 carbon atoms, fluoroalkyl groups containing 1 to 10 carbon atoms and allyl ($-CH_2-CH=CH_2$). Among the most preferred molecules or groups that are substituted on the phenyl ring include methyl, ethyl, isopropyl, tert butyl, cyclohexyl, octyl, nonyl, phenyl, bromo, chloro, fluoro, ethoxy (OEt), methoxy (OMe), cyclopropane (cyclo-$C_3H_5$), trifluoromethyl, methylsulfonyl ($SO_2Me$), and benzyl ($CH_2C_6H_5$). The substituents need not be identical on a particular phenyl ring. For example, a trisubstituted phenyl group such as 2,4 dichloro-6-methyl phenyl. A generalized formula to take the case of the mixed substituents into consideration is, e.g., $WOCl_p(OAr)_q(OAr)_r$ where $p+q+r=4$. Mono, di, tetra, and penta substituted phenols, as well as the aforementioned tri substituted phenols, can also be employed in making the tungsten compounds employed in this invention. The desired tungsten compounds are prepared by reacting the appropriate phenol with $WOCl_4$ in solution. The molar ratio of phenol to $WOCl_4$ is about equal to x in the generalized formula $WOCl_{4-x}(OAr)_x$. The invention is also contemplated to include the use of mixtures of two or more different tungsten compounds. The phenyl ring, symbolized by Ar in the above general formula, may have R substituted at the 1, 2, 3, 4 or 5 positions. In the monosubstituted phenyl ring, R may be at the 2, 3 or 4 positions. In the disubstituted phenyl ring the substituents $R_1$ and R may be at the 2,6; 2,5; 2,4; 2,3; 3,4; or 3,5 positions. R and $R_1$ may be the same or different groups. In the trisubstituted phenyl ring substituents R, $R_1$ and $R_2$ may be at the 2,3,4; 2,3,5; 2,3,6; 2,4,5; 2,4,6 or the 3,4,5 positions, where R, $R_1$ and $R_2$ may be the same or different. The tetra substituted structures for the phenyl ring have substituents at the 2,3,4,6; 2,3,5,6 or the 2,3,4,5 positions, where R, $R_1$, $R_2$ and $R_3$ may be the same or different. An example of such would be made from 2,3,5,6-tetrachlorophenol. The penta substituted ring has substituents at the 2,3,4,5 and 6 positions, where each substituent may be the same or different. An example of the penta substituted structure would be made from $C_6F_5OH$.

The second component of the catalyst system is an activator compound that in combination with the tungsten compound is capable of yielding a catalyst able to polymerize DCPD in bulk. Such activators or co catalysts include, for example organoaluminum compounds such as trialklyaluminum, dialkylaluminum halides, alkylaluminum dihalides, dialkyl(alkoxy)aluminum, alkyl(alkoxy)aluminum halide; dialkylzincs, alkylzinc halides, diarylzinc, arylzinc halides, alkylsilanes ($RSiH_3$, $R_2SiH_2$ and $R_3SiH$, where R is an alkyl group), tetraalkyltins, trialkyltin hydrides, dialkyltin dihydrides, triaryltin hydrides and the corresponding alkyl and aryl lead hydrides. Specific examples of activators include ethylaluminum dichloride, diethylaluminum chloride, triethylaluminum, diethylzinc, dibutylzinc, ethyl n propoxyaluminum chloride, diphenylzinc, tributyltin hydride, trioctyltin hydride, diphenyltin dihydride, and triphenyltin hydride. Preferred activators include triphenyltin hydride and trialkyltin hydrides, such as a tributyltin hydride.

In order to maintain the stability of tungsten compounds of the present invention with the 98-99% dicyclopentadiene without premature gelatin, it is usually necessary to add a stabilizer compound to the solution containing the tungsten compound, and a rate moderator to the solution containing the tin activator compound. It is preferred to store the tungsten compounds in solution in dicyclopentadiene. When the stabilizer compound is omitted, a slow polymerization of the monomer proceeds in the storage container. Stabilizer compounds include diethyl ether ($OEt_2$); ethylene glycol dimethyl ether (monoglyme), 2-methoxyethyl ether (diglyme), triethylene glycol dimethyl ether (triglyme), tetraethylene glycol dimethyl ether (tetraglyme), benzonitrile, acetonitrile, tetrahydrofuran, phenols with one aromatic ring {such as 2,6-di-t-butyl-4-methylphenol (BHT) or 2,6-di-tert-butyl 4-sec-butylphenol, e.g., Isonox 132}, bisphenols with two aromatic rings {such as 4,4'-methylenebis(2,6-dimethylphenol) sold under the tradename Lowinox 44M26 by Lowi Chemical Company of Akron, Ohio; 4,4'-methylenebis(2,6-di tert butylphenol sold under the tradename Lowinox 002; 2,2'-methylenebis(4-ethyl-6-butylphenol) sold under the tradename Cyanox 425; 2,2'-ethylenebis(4,6-di-tert-butylphenol sold under the tradename Vanox 1290; 2,2'-methylenebis-(4-ethyl6-(1-methylcyclohexyl)phenol sold under the tradename Permanax WSP; 4,4'-butylidenebis(6 tert butyl-3-methylphenol) sold under the tradename Lowinox 44B25; 4,4'-thiobis (6-tert-butyl-3-methylphenol sold under the tradename Lowinox 44S36; 1,1'-thiobis-(2-naphthol) sold under the tradename SAO-30; 2,2'-thiobis(4-methyl-6-tert-butylphenol) sold under the tradename SAO-6; 2,2'-isobutylidene-bis(4,6-dimethylphenol sold under the tradename Lowinox 22IB46; or 2,2'-methylenebis(4-methyl-6-cyclohexyl)phenol) sold under the tradename Vulkanox ZKF) or polyphenols with more than two aromatic rings {(such as 1,3,5-trimethyl-2,4 6-tris(3,5-di-t-butyl-4-hydroxybenzene) benzene sold under the tradename Ethyl Antioxidant 330; sterically hindered polynuclear phenols sold under the tradename Lowinox 22CP46 and Lowinox CPL by Lowi Chemical Company or the butylated reaction product of a cresol and dicyclopentadiene such as Wingstay L powder sold by the Goodyear Tire and Rubber Company of Akron, Ohio} may also be used. In addition, mixtures of the above stabilizer compounds such as a mixture of diglyme and one or more phenols or other Lewis bases can be employed in the practice of this invention.

The rate moderator compound prevents the polymerization process from being too rapid, provides for adequate mixing of the catalyst components, and allows the mold to be completely filled. The rate moderator compounds include various nitrogen or phosphorus compounds used for this purpose as described in U.S. Pat. Nos. 4,727,125; 4,883,849; and 4,933,402. These rate moderators are generally selected from the group consisting of phosphines, phosphites, phosphinites, phosphonites, pyridines, and pyrazines. Preferred rate moderators include pyridine (py); pyrazine (pyz); 2,6-dimethylpyrazine ($Me_2pyz$); tributylphosphine ($Bu_3P$); triethylphosphine ($PEt_3$); tricyclohexylphosphine ($PCy_3$); triphenylphosphine ($PPh_3$); methyldiphenylphosphine ($PMePh_2$); dimethylphenylphosphine ($PMe_2Ph$); triethylphosphite ($P(Oet)_3$); tributylphosphite ($P(OBu)_3$); triisopropylphosphite ($P$-$O$-$i$-$Pr)_3$); ethyldiphenylphosphonite ($P(OEt)Ph_2$; triphenylphosphite ($P(OPh)_3$); triisopropylphosphine ($P$-$i$-$Pr_3$); trimethylphosphite ($P(OMe)_3$); tri tert-butylphosphine ($P$-tert-$Bu_3$); diethylphenylphosphonite ($P(OEt)_2Ph$); and tribenzylphosphine ($P(CH_2PH)_3$). The more preferred rate moderators are phosphines and phosphites, e.g., tributylphosphine ($Bu_3P$) and tributylphosphite (($BuO)_3P$). The stabilizer and rate moderator compounds are not necessary when lower purity dicyclopentadiene is employed, unless prolonged storage times are desired. Also, the stabilizer is not necessary when prolonged storage of the catalyst in the monomer is not desired.

In some embodiments of this invention, a preformed elastomer which is soluble in the reactant streams is added to the metathesis-catalyst system in order to increase the impact strength of the polymer. The elastomer is dissolved in either or both of the reactant streams in an amount from about 3 to about 15 weight percent range, based on the weight of monomer. Illustrative elastomers include natural rubber, butyl rubber, polyisoprene, polybutadiene, polyisobutylene, ethylene-propylene copolymer, styrene butadiene styrene triblock rubber, random styrene butadiene rubber, styrene isoprene styrene triblock rubber, ethylene propylene diene terpolymers, ethylene vinyl acetate, and nitrile rubbers. Various polar elastomers can also be employed. The amount of elastomer used is determined by its molecular weight and is limited by the viscosity of the resultant reactant streams. The resultant reactant streams containing elastomer cannot be so viscous that mixing is not possible. Although the elastomer can be dissolved in either one or both of the streams, it is desirable that it be dissolved in both.

In addition to measuring gel and cure times and residual DCPD monomer level, a measurement of swell value was made. The swell value is an indication of the degree of crosslinking in the polymer, i.e., lower swell values indicate higher degree of crosslinking. The general procedure used for swell value determinations is as follows: A 5 gram sample of polymer is removed from its test tube (by breaking the glass) and carefully sliced into 1-2 mm thick sections across the cylindrical axis with a tile cutter. The burrs are removed, each slice weighed to the nearest milligram and strung onto a stainless steel or copper wire taking care to keep them in known sequence. This is done for each sample at a given monomer feed. The wire is made into a closed loop and placed in 50 ml of toluene for each gram of polymer. These flasks are then heated to reflux for 16 hours (overnight) and cooled. Each loop is successively removed from the flask and placed in a small dish of fresh toluene. The slices are removed, patted dry, and weighed individually, again taking care not to disturb their sequence or to tear the swollen samples. The swell values are calculated using the following formula: swell $(\%) = (w_2 - w_1)/w_1 \times 100\%$, where $w_1$ = initial weight of polyDCPD sample and $w_2$ = weight of solvent swollen polyDCPD sample. Since the swell value is an indication of the degree of crosslinking in the polymer, low values are preferred.

The best mode now contemplated of carrying out this invention will be illustrated with the following examples. The examples are given for the purpose of illustration only and the invention is not to be regarded as limited to any of the specific materials or conditions used in the examples.

In the following examples, in which tungsten complex catalyst components are prepared, tungsten hexachloride ($WCl_6$) was obtained from GTE Sylvania Chemical Company and used as received. 2,6-diisopropylphenol and 2,6-dichloro phenol ($HOC_6H_3$—2,6—$Cl_2$) were purchased from Aldrich Chemical Company and used as received. Hexamethyldisiloxane ($Me_3SiOSiMe_3$) (Aldrich) was sparged with dry nitrogen before use.

Cyclopentane, diethyl ether, and pentane were dried over 4 A molecular sieves and sparged with nitrogen prior to use. Toluene was placed in contact with 13X molecular sieves and sparged with dry nitrogen before use.

All operations were carried out under a dry nitrogen atmosphere or in vacuum either in a Vacuum Atmospheres Dri Lab (inerted by argon gas) or using Schlenk techniques. All solvent transfers were performed by cannula or syringe techniques to maintain an inert atmosphere.

In the Examples in which polymerization studies are set forth, the following general procedures were followed. All manipulations were performed anaerobically in nitrogen-sparged pop bottles or under an argon atmosphere (Vacuum Atmospheres Dri-Lab) or using Schlenk techniques. Tri n butyltin hydride (packaged in Sure/Seal bottle) was purchased from Aldrich Chemical Company and stored refrigerated (0° C). Diglyme was dried by placing it over 3A molecular sieves and sparged with nitrogen before use. Where necessary rate moderators, such as tributylphosphite (Albright and Wilson), were dried over molecular sieves and sparged with dry nitrogen prior to use.

Polymerizations were conducted in nitrogen-sparged test tubes by adding together the catalyst and activator components (2.5 ml of each), mixing on a vortex mixer and then inserting the tube into an oil bath at 80° C. or higher or into a heated block at about 33° C. Gel times were estimated by observing the initial viscosity change and the times were taken when the polymerization increased the exotherm to 100° C. ($T_{100° C.}$)or 180° C. ($T_{180° C.}$), and to the maximum temperature of the polymerization ($T_{max}$). Polymer swells were obtained by refluxing the samples in toluene for 16 hours, cooling for four hours and determining the percentage weight gain.

The tungsten starting material used in all catalyst preparation is tungsten oxytetrachloride complex ($WOCl_4$). This compound was prepared in the following manner. A solution of hexamethyl-disiloxane (HMDS) (13.40 ml, 0.063 mol) in toluene (100 ml) was added dropwise into a toluene (200 ml) solution of $WCl_6$ (25 g; 0 063 mol) in a 500 ml round bottomed flask (with stirring) over a 75 minute period. After the HMDS addition was completed, the column was removed and the reaction mixture was allowed to stir overnight under nitrogen. The brown solution was filtered in the dry box to yield a quantity of crude, orange $WOCl_4$ (19.02 g; 88% yield). Immediately before use, the crude material was sublimed under reduced pressure at 100° C. in small portions to give bright orange crystalline $WOCl_4$. Pure commercial quantities of $WOCl_4$ may be substituted in any of the catalyst preparations.

EXAMPLE 1

A tungsten phenoxide catalyst having the formula $WOCl_2(OC_6H_3$—2,6—i—$Pr_2)_2$ was prepared in the following manner. The addition of two moles of the phenol for each mole of $WOCl_4$ produced the desired tungsten phenoxide compound. A quantity of $WOCl_4$ (5 g; 0.0146 moles) was placed in a pop bottle together with a stir bar. Toluene (50 mL) was added to the $WOCl_4$ by cannula followed by the dropwise addition of neat 2,6-diisopropylphenol ($HOC_6H_3$—2,6—i—$Pr_2$) (5.42 mL; 0.0296 mol). The reaction mixture was allowed to stir at room temperature for three days under a nitrogen sparge. After this time, the reaction mixture was taken into the dry box, scraped from the bottle, and further dried under reduced pressure. The complex $WOCl_2(OC_6H_3$—2,6—i—$Pr_2$), (8.83 g; 97% yield) was obtained as a dark purple solid.

Alternatively the catalyst may be prepared in accordance with the following procedure: To a quantity of $WOCl_4$ (5 g; 0.0146 moles) stirring in cyclopentane (100 Ml) was added dropwise a solution of 2,6-diisopropylphenol ($HOC_6H_3$—2,6—i—$Pr_2$) (5.42 mL; 0.0296 mol) in cyclopentane (50 mL). The dropwise addition of the phenolic solution was accomplished over a period of 30 minutes and accompanied by the solution changing from orange to deep red. The reaction was allowed to stir at room temperature for two hours. After this time, the reaction mixture was taken into the dry box and filtered. No solids were collected and the filtrate was evaporated to dryness under reduced pressure. The complex $WOCl_2(OC_6H_3$_2,6—i—$Pr_2)_2$ (8.22 g; 90% yield) was obtained as a crystalline dark purple solid.

EXAMPLE 2

A tungsten phenoxide catalyst having the formula $WOCl_3(OC_6H_3$—2,6—$Cl_2$) was made by mixing $WOCl_4$ (3.79 g; 0.0111 moles) in cyclopentane (50 ml). A dropwise solution of 2,6 dichlorophenol (1.18 ml; 0.111 mole) in cyclopentane (25 ml) was then added dropwise over a period of 30 minutes. During the phenol addition the solution changed color from orange to deep red and purple crystals precipitated from the reaction solution. The reaction was allowed to stir at room temperature for two hours. After this time the reaction mixture was taken into the dry box and filtered. The solids collected by filtration were washed with 10 ml of pentane and dried in vacuum, yielding 4.20 g (81%). The filtrate was evaporated to dryness under reduced pressure and was determined to be the same complex as the solid.

The complex obtained, $WOCl_3(OC_6H_3$—2,6—$Cl_2$) was obtained as a dark red-purple solid. Other $WOCl_3(OAr)$ compounds can be prepared by substitution of other phenols for 2,6-dichlorophenol.

EXAMPLE 3

A quantity (3.5 g; 7.475 mmol) of the product of Example 2 was used to make a tungsten phenoxide compound having the formula $WOCl_2(OC_6H_3$—2,6—$Cl_2)_2$. Said quantity was dissolved in a minimum quantity of diethyl ether (50 ml). A saturated solution of lithium 2,6-dichlorophenoxide ($LiOC_6H_3$—2,6—$Cl_2$) (1.28 g ml; 7.58 mmol) in diethyl ether (about 8 ml) was slowly added dropwise. Almost instantly, the deposition of red crystals occurred. The reaction mixture was stirred at room temperature with a slow nitrogen purge over the ether solution for 150 minutes. After an additional one hour of stirring, the reaction mixture was filtered to remove a dark red crystalline $WOCl_2(OC_6H_3-2,6-Cl_2)_2$. The solid was then washed with a small volume of dried pentane (5 ml) and the solid dried under vacuum (3.90 g). This material was dissolved in dichloromethane (about 25 ml) and filtered to remove the lithium chloride by product. Evaporation of the filtrate under reduced pressure led to pure product in 72% yield (3.21 g).

EXAMPLE 4

In Example 4, stock solutions of the catalyst mixtures were prepared by charging a ten ounce pop bottle with the appropriate measure of $WOCl_3(OC_6H_3-2,6-Cl_2)$ prepared according to the process of Example 2 (a shorthand for referring to the tungsten catalyst compound in this example and in the following examples is "W"), DCPD and diglyme (DG). The activator solution was prepared by mixing tri-n-butyltin hydride (n-$Bu_3SnH$); the appropriate quantity of tributylphosphite (TBP) and DCPD in a 10 ounce pop bottle. The following table indicates the amounts of materials used in preparing these two solutions.

| Reaction Ratio DCPD:W:DG:n-Bu$_3$SnH:TBP | A-Component DCPD:n-Bu$_3$SnH:TBP | B-Component DCPD:W:DG |
| --- | --- | --- |
| 2000:1:2:2:3 | 1000:2:3 | 1000:1:2 |
| | 50:0.39:0.60 (mL) | 50:0.172:0.11 (mL) |
| 2000:1:2:3:3 | 1000:3:3 | 1000:1:2 |
| | 50:0.59:0.60 (mL) | 50:0.172:0.11 (mL) |

The final reaction ratio for mixed catalyst and activator components varied DCPD:W:diglyme:n-$Bu_3SnH$:TBP=2000:1:2:2:3 to 2000:1:2:3:3 (see Table 1)

TABLE 1

DCPD Polymerization By $WOCl_3(OC_6H_3-2,6-Cl_2)$/n-$Bu_3SnH$ Mixtures

| DCPD:W:DG:Sn:TBP | Initial Temp. (°C.) | $t_{gel}$ (sec) | $t_{100°C.}$ (sec) | $t_{180°C.}$ (sec) | $tT_{max}$ (sec) | $T_{max}$ (sec) | Swell (%) | Residual Monomer (%) |
| --- | --- | --- | --- | --- | --- | --- | --- | --- |
| 2000:1:2:2:3 | 30 | 1 | 8 | 13 | 26 | 206 | 78.8 | 0.009 |
| 2000:1:2:2:3 | 30 | 1 | 7 | 13 | 29 | 206 | — | — |
| 2000:1:2:2:3 | 80 | 1 | 8 | 13 | 26 | 210 | 85.0 | 0.25 |
| 2000:1:2:2:3 | 30 | 1 | 4 | 11 | 24 | 195 | — | — |
| 2000:1:2:3:3 | 30 | 1 | 4 | 10 | 22 | 203 | 79.2 | 0.12 |
| 2000:1:2:3:3 | 80 | 1 | 5 | 12 | 26 | 207 | 82.7 | 0.23 |

EXAMPLE 5

In Example 5 the catalyst stock solution was prepared by charging a 10 oz pop bottle with the appropriate amount of $WOCl_2(OC_6H_3—2,6—CL_2)_2$, DCPD and DG. Stock solutions of the activator were prepared by charging a 10 oz pop bottle with the appropriate amounts of n-$Bu_3SnH$ and TBP. The following table indicates the amounts of materials used.

| Reaction Ratio DCPD:W:DG:n-Bu$_3$SnH:TBP | A-Component DCPD:n-Bu$_3$SnH:TBP | B-Component DCPD:W:DG |
| --- | --- | --- |
| 2000:1:2:2:3 | 1000:3:2 | 1000:1:2 |
| | 100 mL:0.39 mL:0.40 mL | 100 mL:0.44 g:0.22 mL |
| 4000:1:2:2:3 | 2000:3:2 | 2000:1:2 |
| | 100 mL:0.20 mL:0.20 mL | 100 mL:0.22 g:0.11 mL |
| 8000:1:2:2:3 | 4000:3:2 | 4000:1:2 |
| | 100 mL:0.10 mL:0.10 mL | 100 mL:0.11 g:0.05 mL |
| 2000:1:2:3:3 | 1000:3:2 | 1000:1:2 |
| | 100 mL:0.59 mL:0.59 mL | 100 mL:0.44 g:0.22 mL |
| 4000:1:2:3:3 | 2000:3:2 | 2000:1:2 |
| | 100 mL:0.30 mL:0.30 mL | 100 mL:0.22 g:0.11 mL |
| 8000:1:2:3:3 | 4000:3:2 | 4000:1:2 |
| | 100 mL:0.15 mL:0.15 mL | 100 mL:0.11 g:0.05 mL |

The final reaction ratio for mixed catalyst and activator components was varied from DCPD:W:diglyme:n-$Bu_3SnH$:TBP=2000:2:8:3 to 8000:1:2:8:3 (see Table 2).

TABLE 2

DCPD Polymerization By $WOCl_2(OC_6H_3-2,6-Cl_2)_2$/n-$Bu_3SnH$ Mixtures
Effect of DCPD:$WOCl_2(OC_6H_3-2,6-Cl_2)_2$ Ratio On Residual DCPD Levels

| DCPD:W:DG:Sn:TBP | Initial Temp. (°C.) | $t_{gel}$ (sec) | $t_{100°C.}$ (sec) | $t_{180°C.}$ (sec) | $tT_{max}$ (sec) | $T_{max}$ (sec) | Swell (%) | Residual Monomer (%) |
| --- | --- | --- | --- | --- | --- | --- | --- | --- |
| 2000:1:2:2:3 | 30 | 10 | 32 | 38 | 51 | 208 | 79.0 | 0.04 |
| 2000:1:2:2:3 | 80 | 8 | 17 | 22 | 34 | 208 | 90.5 | 0.09 |
| 4000:1:2:2:3 | 33 | 6 | 22 | 27 | 40 | 208 | 76.5 | 0.07 |
| 4000:1:2:2:3 | 80 | 8 | 16 | 22 | 36 | 211 | 85.7 | 0.21 |
| 8000:1:2:2:3 | 33 | 7 | 33 | 36 | 51 | 209 | 76.7 | 0.17 |
| 8000:1:2:2:3 | 80 | 6 | 21 | 28 | 39 | 192 | 91.3 | 0.57 |
| 2000:1:2:3:3 | 30 | 8 | 25 | 31 | 43 | 204 | 80.6 | 0.11 |
| 2000:1:2:3:3 | 80 | 8 | 17 | 21 | 32 | 212 | 94.9 | 0.16 |

TABLE 2-continued

DCPD Polymerization By $WOCl_2(OC_6H_3-2,6-Cl_2)_2$/n-$Bu_3SnH$ Mixtures
Effect of DCPD:$WOCl_2(OC_6H_3-2,6-Cl_2)_2$ Ratio On Residual DCPD Levels

| DCPD:W:DG:Sn:TBP | Initial Temp. (°C.) | $t_{gel}$ (sec) | $t_{100°C.}$ (sec) | $t_{180°C.}$ (sec) | $t_{T_{max}}$ (sec) | $T_{max}$ (sec) | Swell (%) | Residual Monomer (%) |
| --- | --- | --- | --- | --- | --- | --- | --- | --- |
| 4000:1:2:3:3 | 33 | 4 | 21 | 27 | 39 | 207 | 80.0 | 0.12 |
| 4000:1:2:3:3 | 80 | 4 | 16 | 22 | 37 | 215 | 91.6 | 0.22 |
| 8000:1:2:3:3 | 33 | 5 | 23 | 29 | 42 | 204 | 75.6 | 0.40 |
| 8000:1:2:3:3 | 80 | 5 | 19 | 24 | 38 | 209 | 90.0 | 0.44 |

EXAMPLE 6

In Example 6 the catalyst stock solution was prepared by charging a 10 oz pop bottle with the appropriate amount of $WOCl_2(OC_6H_3-2,6-i-Pr_2)_2$, DCPD and diglyme. Stock solutions of the activator were prepared by charging a 10 oz pop bottle with the appropriate amounts of n-BuSnH and tributylphosphite ((TBP). The following table indicates the amounts of materials used.

| Reaction Ratio DCPD:W:DG:n-$Bu_3SnH$:TBP | A-Component DCPD:n-$Bu_3SnH$:TBP | B-Component DCPD:W:DG |
| --- | --- | --- |
| 2000:1:2:1:3 | 1000:1:3 | 1000:1:2 |
|  | 100 mL:0.20 mL:0.60 mL | 100 mL:0.44 g:0.22 mL |
| 2000:1:2:2:3 | 1000:2:3 | 1000:1:2 |
|  | 100 mL:0.40 mL:0.60 mL | 100 mL:0.44 g:0.22 mL |
| 2000:1:2:3:3 | 1000:3:2 | 1000:1:2 |
|  | 100 mL:0.59 mL:0.60 mL | 100 mL:0.44 g:0.22 mL |
| 2000:1:2:6:3 | 1000:6:3 | 1000:1:2 |
|  | 100 mL:1.18 mL:0.60 mL | 100 mL:0.44 g:0.22 mL |
| 2000:1:2:8:3 | 1000:8:3 | 1000:1:2 |
|  | 100 mL:1.58 mL:0.60 mL | 100 mL:0.44 g:0.22 mL |

The final reaction ratio for mixed catalyst and activator components was varied from DCPD:W:diglyme:n-$Bu_3SnH$:TBP=2000:1:2:1:3 to 2000:1:2:8:3 (see Table 3)

amounts of n-$Bu_3SnH$ and TBP. The following table indicates the amounts of materials used.

The final reaction ratio for mixed catalyst and activator components was varied from DCPD:W:diglyme:n-$Bu_3SnH$:TBP=2000:1:2:3:0 to 2000:1:2:3:4 (see Table 4)

EXAMPLE 8

In Example 8, various Lewis bases were used to delay polymerization with a $WOCl_2(OC_6H_3-2,6-i-Pr_2)_2$, catalyst compound and n-$Bu_3SnH$ activator compound.

Among the Lewis bases were tributylphosphite $((BuO)_3P)$, pyridine (py); 2,6-dimethylpyridine (2,6—$Me_2py$); pyrazine (pyz), 2,6-dimethylpyrazine (2,6-$Me_2pyz$); triisopropylphosphite $((i-PrO)_3P)$; dibutylphosphite $((BuO)_2P(O)H)$ and tributylphosphine $(Bu_3P)$. The same general polymerization procedure was employed as was previously explained herein. The proportions of dicyclopentadiene (DCPD): tungsten catalyst (W): diglyme (DG): tri-n-butyltin hydride (Sn): Lewis base (LB) is shown in the results that are shown in Table 5.

TABLE 3

DCPD Polymerization By $WOCl_2(OC_6H_3-2,6-Cl_2)_2$/n-$Bu_3SnH$ Mixtures:
Effect of $WOCl_2(OC_6H_3-2,6-Cl_2)_2$/n-$Bu_3SnH$ Ratio On Residual DCPD Levels

| DCPD:W:DG:Sn:TBP | Initial Temp. (°C.) | $t_{gel}$ (sec) | $t_{100°C.}$ (sec) | $t_{180°C.}$ (sec) | $t_{T_{max}}$ (sec) | $T_{max}$ (sec) | Swell (%) | Residual Monomer (%) |
| --- | --- | --- | --- | --- | --- | --- | --- | --- |
| 2000:1:2:1:3 | 33 | 15 | 50 | 55 | 70 | 210 | 88.1 | 0.12 |
| 2000:1:2:1:3 | 80 | 12 | 29 | 41 | 49 | 190 | 103.8 | 2.04 |
| 2000:1:2:2:3 | 33 | 8 | 30 | 34 | 46 | 208 | 90.8 | 0.06 |
| 2000:1:2:2:3 | 80 | 7 | 19 | 22 | 34 | 211 | 102.1 | 0.12 |
| 2000:1:2:3:3 | 30 | 8 | 25 | 31 | 43 | 204 | 80.6 | 0.11 |
| 2000:1:2:3:3 | 80 | 8 | 17 | 21 | 32 | 212 | 94.9 | 0.16 |
| 2000:1:2:6:3 | 33 | 1 | 13 | 17 | 30 | 200 | 94.9 | 0.30 |
| 2000:1:2:6:3 | 80 | 1 | 12 | 17 | 29 | 210 | 109.5 | 0.38 |
| 2000:1:2:8:3 | 34 | 1 | 10 | 16 | 29 | 211 | 97.6 | 0.54 |
| 2000:1:2:8:3 | 80 | 1 | 10 | 16 | 29 | 202 | 103.1 | 0.50 |

EXAMPLE 7

In Example 7 the stock solution of the catalyst was prepared by mixing the appropriate amounts of $WOCl_2(OC_6H_3-2,6-i-Pr_2)_2$, DCPD and DG in a 10 oz pop bottle. Activator stock solutions were prepared by charging a 10 oz pop bottle with the appropriate

| Reaction Ratio DCPD:W:DG:n-$Bu_3SnH$:TBP | A-Component DCPD:n-$Bu_3SnH$:TBP | B-Component DCPD:W:DG |
| --- | --- | --- |
| 2000:1:2:3:2 | 1000:3:2 | 1000:1:2 |
|  | 100 mL:0.59 mL:0.40 mL | 100 mL:0.50 g:0.21 mL |
| 2000:1:2:3:3 | 1000:3:3 | 1000:1:2 |
|  | 100 mL:0.59 mL:0.59 mL | 100 mL:0.50 g:0.21 mL |
| 2000:1:2:3:4 | 1000:3:4 | 1000:1:2 |
|  | 100 mL:0.59 mL:0.79 mL | 100 mL:0.50 g:0.21 mL |

-continued

| Reaction Ratio DCPD:W:DG:n-Bu₃SnH:TBP | A-Component DCPD:n-Bu₃SnH:TBP | B-Component DCPD:W:DG |
|---|---|---|
| 2000:1:2:3:8 | 1000:3:8 100 mL:0.59 mL:1.59 mL | 1000:1:2 100 mL:0.50 g:0.21 mL |

TABLE 4

DCPD Polymerization By $WOCl_2(OC_6H_3\text{-}2,6\text{-}Cl_2)_2$/n-Bu₃SnH Mixtures:
Effect of $WOCl_2(OC_6H_3\text{-}2,6\text{-}Cl_2)_2$/TBP Ratio on Residual DCPD Levels

| DCPD:W:DG:Sn:TBP | Initial Temp. (°C.) | $t_{gel}$ (sec) | $t_{100°\ C.}$ (sec) | $t_{180°\ C.}$ (sec) | $t_{T_{max}}$ (sec) | $T_{max}$ (sec) | Swell (%) | Residual Monomer (%) |
|---|---|---|---|---|---|---|---|---|
| 2000:1:2:3:2 | 33 | 5 | 16 | 21 | 33 | 207 | 91.4 | 0.10 |
| 2000:1:2:3:2 | 33 | 4 | 18 | 23 | 35 | 208 | — | — |
| 2000:1:2:3:2 | 80 | 5 | 14 | 18 | 30 | 210 | 102.9 | 0.15 |
| 2000:1:2:3:2 | 80 | 4 | 14 | 19 | 31 | 207 | — | — |
| 2000:1:2:3:3 | 30 | 8 | 25 | 31 | 43 | 204 | 80.6 | 0.11 |
| 2000:1:2:3:3 | 30 | 8 | 29 | 34 | 47 | 205 | — | — |
| 2000:1:2:3:3 | 80 | 8 | 17 | 21 | 32 | 212 | 94.9 | 0.16 |
| 2000:1:2:3:3 | 80 | 8 | 17 | 21 | 37 | 215 | — | — |
| 2000:1:2:3:4 | 33 | 9 | 31 | 37 | 49 | 207 | 96.0 | 0.15 |
| 2000:1:2:3:4 | 33 | 9 | 33 | 38 | 49 | 199 | — | — |
| 2000:1:2:3:4 | 80 | 8 | 18 | 23 | 36 | 212 | 111.1 | 0.27 |
| 2000:1:2:3:4 | 80 | 9 | 19 | 24 | 36 | 213 | — | — |
| 2000:1:2:3:4 | 33 | 16 | 63 | 66 | 80 | 206 | 96.7 | 0.17 |
| 2000:1:2:3:8 | 33 | 19 | 66 | 72 | 85 | 202 | — | — |
| 2000:1:2:3:8 | 80 | 13 | 25 | 31 | 45 | 217 | 106.8 | 0.26 |
| 2000:1:2:3:8 | 80 | 14 | 24 | 30 | 45 | 217 | — | — |

TABLE 5

Activation of $WOCl_2(OC_6H_3\text{-}2,6\text{-i-}Pr_2)_2$ By
n-Bu₃SnH: Effect of Various Lewis Bases

| DCPD:W:DG:Sn:LB | Lewis Base (LB) | Initial Temp. (°C.) | $t_{gel}$ (sec) | $t_{100°\ C.}$ (sec) | $t_{180°\ C.}$ (sec) | $t_{T_{max}}$ (sec) | $T_{max}$ (sec) | Swell (%) | Residual Monomer (%) |
|---|---|---|---|---|---|---|---|---|---|
| 2000:1:2:3:3 | (BuO)₃P | 30 | 7 | 23 | 28 | 41 | 206 | 75.9 | 0.35 |
| 2000:1:2:3:3 | (BuO)₃P | 80 | 9 | 24 | 30 | 45 | 211 | 95.5 | 0.33 |
| 2000:1:2:3:3 | py | 31 | 90 | 319 | — | 345 | 175 | 160.4 | 0.39 |
| 2000:1:2:3:3 | py | 80 | 40 | 53 | 57 | 78 | 212 | 145.2 | 0.63 |
| 2000:1:2:3:3 | 2,6-Me₂py | 30 | 1 | 15 | 21 | 33 | 204 | 94.1 | 0.37 |
| 2000:1:2:3:3 | pyz | 30 | 14 | 331 | — | 275 | 175 | 176.9 | 0.34 |
| 2000:1:2:3:3 | pyz | 80 | 10 | 49 | 52 | 65 | 211 | 162.2 | 0.77 |
| 2000:1:2:3:3 | 2,6-Me₂pyz | 30 | 12 | 60 | 69 | 85 | 198 | 147.0 | 0.39 |
| 2000:1:2:3:3 | 2,6-Me₂pyz | 80 | 10 | 32 | 37 | 48 | 208 | 143.0 | 0.49 |
| 2000:1:2:3:3 | (i-PrO)₃P | 30 | 14 | 25 | 30 | 47 | 210 | 71.8 | 0.29 |
| 2000:1:2:3:3 | (i-PrO)₃P | 80 | 10 | 15 | 22 | 38 | 204 | 82.0 | 0.65 |
| 2000:1:2:3:3 | (BuO)₂P(O)H | 31 | 44 | 86 | 91 | 108 | 205 | 91.9 | 0.31 |
| 2000:1:2:3:3 | (BuO)₂P(O)H | 80 | 22 | 31 | 39 | 58 | 212 | 98.4 | 0.68 |
| 2000:1:2:3:3 | iBu₃P | 80 | 100 | 120 | 128 | 140 | 220 | 115.8 | 0.63 |

EXAMPLE 9

In Example 9, the effect of various Lewis bases upon polymerization and the polymer produced was conducted with $WOCl_2(OC_6H_3-2,6\text{-}Cl_2)_2$ tungsten phenoxide catalysts and tri-n-butyltin hydride activator. The abbreviations in the following Table 6 are the same as explained in Example 8.

EXAMPLE 10

In Example 10 the effect of tributylphosphine upon polymerization when using a $WOCl_2(OC_6H_3-2,6\text{-i-}Pr_2)_2$ (example 1) catalyst was determined. The effect upon polymerization is seen in Table 7.

EXAMPLE 11 In Example 11 a similar comparison of the effect of tributylphosphine was conducted as in Example 9 with $WOCl_2(OC_6H_3-2,6\text{-}Cl_2)_2$ as the tungsten catalyst. The results are shown in Table 8.

TABLE 6

Activation of $WOCl_2(OC_6H_3\text{-}2,6\text{-}Cl_2)_2$ By
n-Bu₃SnH: Effect of Various Lewis Bases

| DCPD:W:DG:Sn:TBP | Lewis Base (LB) | Initial Temp. (°C.) | $t_{gel}$ (sec) | $t_{100°\ C.}$ (sec) | $t_{180°\ C.}$ (sec) | $t_{T_{max}}$ (sec) | $T_{max}$ (°C.) | Swell (%) | Residual Monomer (%) |
|---|---|---|---|---|---|---|---|---|---|
| 2000:1:2:3:3 | (BuO)₃P | 30 | 7 | 25 | 31 | 47 | 207 | 82.1 | 0.12 |
| 2000:1:2:3:3 | (BuO)₃P | 80 | 7 | 20 | 24 | 40 | 212 | 994.1 | 0.20 |
| 2000:1:2:3:3 | py | 30 | 120 | 254 | 268 | 282 | 198 | 91.7 | 0.35 |
| 2000:1:2:3:3 | py | 80 | 29 | 36 | 39 | 55 | 219 | 114.8 | 0.26 |
| 2000:1:2:3:3 | pyz | 30 | 1 | 33 | 42 | 58 | 195 | 98.9 | 0.37 |
| 2000:1:2:3:3 | 2,6-Me₂py | 30 | 8 | 31 | 41 | 48 | 188 | 88.6 | 0.50 |
| 2000:1:2:3:3 | 2,6-Me₂pyz | 80 | 5 | 16 | 24 | 35 | 200 | 94.1 | 0.43 |

TABLE 6-continued

Activation of $WOCl_2(OC_6H_3\text{-}2,6\text{-}Cl_2)_2$ By n-Bu$_3$SnH: Effect of Various Lewis Bases

| DCPD:W:DG:Sn:TBP | Lewis Base (LB) | Initial Temp. (°C.) | $t_{gel}$ (sec) | $t_{100°C.}$ (sec) | $t_{180°C.}$ (sec) | $t_{Tmax}$ (sec) | $T_{max}$ (°C.) | Swell (%) | Residual Monomer (%) |
|---|---|---|---|---|---|---|---|---|---|
| 2000:1:2:3:3 | (i-PrO)$_3$P | 30 | 1 | 134 | 19 | 31 | 203 | 78.1 | 0.17 |
| 2000:1:2:3:3 | (BuO)$_2$P(O)H | 30 | 66 | 202 | 212 | 230 | 200 | 87.3 | 0.13 |
| 2000:1:2:3:3 | (BuO)$_2$P(O)H | 80 | 23 | 30 | 33 | 47 | 213 | 90.6 | 0.23 |
| 2000:1:2:3:3 | Bu$_3$P | 80 | 90 | 123 | 129 | 140 | 230 | 95.3 | 0.28 |

TABLE 7

Polymerization Using $WOCl_2(OC_6H_3\text{-}2,6\text{-}i\text{-}Pr_2)_2$/n-Bu$_3$SnH: Effect of Tributylphosphine (Bu$_3$P)

| DCPD:W:DG:Sn:Bu$_3$P | Initial Temp. (°C.) | $t_{gel}$ (sec) | $t_{100°C.}$ (sec) | $t_{180°C.}$ (sec) | $t_{Tmax}$ (sec) | $T_{max}$ (°C.) | Swell (%) | Residual Monomer (%) |
|---|---|---|---|---|---|---|---|---|
| 2000:1:2:3:1 | 80 | 56 | 73 | 76 | 90 | 223 | — | — |
| 2000:1:2:3:1 | 80 | 55 | 76 | 78 | 100 | 229 | 129.8 | 1.36 |
| 2000:1:2:3:2 | 80 | 76 | 98 | 102 | 118 | 224 | 145.5 | 0.66 |
| 2000:1:2:3:2 | 80 | 70 | 93 | 98 | 116 | 222 | — | — |
| 2000:1:2:3:3 | 80 | 100 | 120 | 128 | 248 | 220 | 115.8 | 0.63 |
| 2000:1:2:3:3 | 80 | 100 | 124 | 128 | 150 | 228 | 120.6 | 0.96 |

TABLE 8

Polymerization Using $WOCl_2(OC_6H_3\text{-}2,6\text{-}Cl_2)_2$/n-Bu$_3$SnH: Effect of Tributylphosphine (Bu$_3$P)

| DCPD:W:DG:Sn:Bu$_3$P | Initial Temp. (°C.) | $t_{gel}$ (sec) | $t_{100°C.}$ (sec) | $t_{180°C.}$ (sec) | $t_{Tmax}$ (sec) | $T_{max}$ (°C.) | Swell (%) | Residual Monomer (%) |
|---|---|---|---|---|---|---|---|---|
| 2000:1:2:3:1 | 32 | 81 | 160 | 163 | 177 | 205 | 83.9 | 0.17 |
| 2000:1:2:3:1 | 32 | 150 | 218 | 223 | 235 | 202 | — | — |
| 2000:1:2:3:1 | 80 | 24 | 30 | 46 | 60 | 215 | — | — |
| 2000:1:2:3:1 | 80 | 30 | 40 | 46 | 64 | 222 | 89.1 | 0.24 |
| 2000:1:2:3:2 | 80 | 74 | 84 | 87 | 112 | 227 | — | — |
| 2000:1:2:3:2 | 80 | 66 | 84 | 87 | 103 | 233 | 93.3 | 0.35 |
| 2000:1:2:3:3 | 80 | 90 | 123 | 129 | 140 | 230 | 95.3 | 0.28 |
| 2000:1:2:3:3 | 80 | 114 | 136 | 140 | 159 | 232 | — | — |

EXAMPLES 12-13

In Examples 12 and 13 various activators are used instead of the tributyltin hydride used in the previous examples. Among the activators tested were triphenyltin hydride (Ph$_3$SnH), diethylaluminum chloride (Et$_2$AlCl), diethylzinc (DEZ), diisobutylzinc (DIBZ), and ethyl-n-propoxyaluminum chloride (Et(n Pro)AlCl) (ENPAC). Example 12 employed the diisopropyl substituted tungsten compound of Example 1, and in Table 9 are seen the activators that worked to polymerize the DCPD monomer.

In Example 13 the tungsten compound of Example 3 was used with various activator compounds. Table 10 shows the results of DCPD polymerization with such activators.

EXAMPLE 14

Polymerization of dicyclopentadiene was completed utilizing WOCl$_3$(OAr) catalysts and n Bu$_3$SnH. The WOCl$_3$(OAr) catalysts were prepared in accordance with the general procedure of Example 2.

EXAMPLES 15-16

In Examples 15 and 16 the activator used was a mixture of tri-n-butyltin hydride and triethylsilane (EtSiH). The tungsten compound of Example 1 was used in the polymerizations of Example 15, the results of which are shown in Table 11. The tungsten compound of Example 3 was used in the polymerizations of Example 16, the results of which are shown in Table 12.

TABLE 9

DCPD Polymerization Utilizing Various Activators In Combination with $WOCl_2(OC_6H_3\text{-}2,6\text{-}i\text{-}Pr_2)_2$

| DCPD:W:DG:Ac | Activator | Initial Temp. (°C.) | $t_{gel}$ (sec) | $t_{100°C.}$ (sec) | $t_{180°C.}$ (sec) | $t_{Tmax}$ (sec) | $T_{max}$ (°C.) | Swell (%) | Residual Monomer (%) |
|---|---|---|---|---|---|---|---|---|---|
| 2000:1:2:3 | n-Bu$_3$SnH* | 30 | 7 | 23 | 28 | 41 | 206 | 75.9 | 0.35 |
| 2000:1:2:3:3 | n-Bu$_3$SnH* | 80 | 9 | 24 | 30 | 45 | 211 | 95.5 | 0.33 |
| 2000:1:2:3:3 | Ph$_3$SnH | 30 | 1 | 27 | 31 | 48 | 210 | 65.6 | 0.28 |
| 2000:1:2:3:3 | Ph$_3$SnH | 80 | 1 | 26 | 30 | 45 | 214 | 76.1 | 0.73 |
| 2000:1:2:3:3 | Ph$_3$SnH* | 80 | 40 | 79 | 84 | 98 | 229 | 83.7 | 0.58 |
| 2000:1:2:3:3 | Et$_2$AlCl | 30 | 1 | 160 | 169 | 190 | 193 | 58.1 | 0.55 |
| 2000:1:2:3:3 | Et$_2$AlCl | 80 | 2 | 44 | 47 | 61 | 220 | — | — |
| 2000:1:2:3:3 | Et$_2$AlCl* | 80 | 16 | 147 | 159 | 168 | 212 | 69.3 | 2.04 |

TABLE 9-continued

DCPD Polymerization Utilizing Various Activators In Combination with $WOCl_2(OC_6H_3-2,6-i-Pr_2)_2$

| DCPD:W:DG:Ac | Activator | Initial Temp. (°C.) | $t_{gel}$ (sec) | $t_{100°C}$ (sec) | $t_{180°C}$ (sec) | $tT_{max}$ (sec) | $T_{max}$ (°C.) | Swell (%) | Residual Monomer (%) |
|---|---|---|---|---|---|---|---|---|---|
| 2000:1:2:3:3 | DIBZ** | 80 | 25 | 1.5 | 245 | 260 | 196 | 92.9 | 1.71 |

*Addition of one mole equivalent of tributylphosphite (TBP) per mole of activator.
**Addition of one mole equivalent of diglyme (DG) per mole of activator.

TABLE 9

DCPD Polymerization Utilizing Various Activators In Combination with $WOCl_2(OC_6H_3-2,6-Cl_2)_2$

| DCPD:W:DG:Ac | Activator | Initial Temp. (°C.) | $t_{gel}$ (sec) | $t_{100°C}$ (sec) | $t_{180°C}$ (sec) | $tT_{max}$ (sec) | $T_{max}$ (°C.) | Swell (%) | Residual Monomer (%) |
|---|---|---|---|---|---|---|---|---|---|
| 2000:1:2:3 | n-Bu₃SnH* | 30 | 7 | 19 | 25 | 41 | 209 | 94.1 | 0.12 |
| 200:1:2:3 | n-Bu₃SnH* | 80 | 4 | 18 | 24 | 39 | 209 | 82.1 | 0.20 |
| 2000:1:2:3:3 | Ph₃SnH | 30 | 1 | 74 | 85 | 99 | 200 | — | — |
| 2000:1:2:3:3 | Ph₃SnH | 80 | 1 | 30 | 34 | 48 | 214 | 110.0 | 0.27 |
| 2000:1:2:3:3 | Ph₃SnH* | 80 | 72 | 172 | 182 | 200 | 222 | 114.9 | 1.10 |
| 2000:1:2:3:3 | Et₂AlCl** | 30 | 12 | 104 | 114 | 130 | 202 | 67.7 | 1.8 |
| 2000:1:2:3:3 | Et₂AlCl** | 80 | 9 | 35 | 39 | 48 | 207 | 89.1 | 2.9 |
| 2000:1:2:3:3 | ENPAC | 80 | 90 | 279 | 282 | 300 | 239 | 126.1 | 0.41 |
| 2000:1:2:3:3 | DEZ** | 25 | 1 | 7 | 13 | 23 | 193 | — | — |
| 2000:1:2:3:3 | DIBZ** | 30 | 1 | 19 | 25 | 36 | 205 | — | — |
| 2000:1:2:3:3 | DIBZ** | 28 | 1 | 29 | 33 | 50 | 208 | — | — |
| 2000:1:2:3:3 | DIBZ** | 80 | 1 | 24 | 27 | 46 | 209 | — | — |

*Addition of one mole equivalent of tributylphosphite (TBP) per mole of activator.
**Addition of one mole equivalent of diglyme (DG) per mole of activator.

TABLE 11

Reactivity of $WOCl_2(OC_6H_3-2,6-i-Pr_2)_2$ with Different Ratios of Tri-n-Butyltin Hydride and Triethylsilane

| Activator | Initial Temp. (°C.) | $t_{gel}$ (sec) | $t_{100°C}$ (sec) | $t_{180°C}$ (sec) | $tT_{max}$ (sec) | $T_{max}$ (°C.) | Swell (%) | Residual Monomer (%) |
|---|---|---|---|---|---|---|---|---|
| 75% n-Bu₃SnH: 25% Et₃SiH | 30 | 12 | 33 | 37 | 53 | 209 | 104.1 | 0.09 |
| 75% n-Bu₃SnH: 25% Et₃SiH | 80 | 9 | 24 | 28 | 44 | 215 | 105.6 | 0.28 |
| 50% n-Bu₃SnH: 50% Et₃SiH | 30 | 15 | 58 | 64 | 80 | 202 | 87.1 | 0.11 |
| 50% n-Bu₃SnH: 50% Et₃SiH | 80 | 11 | 27 | 31 | 46 | 213 | 93.8 | 0.31 |
| 25% n-Bu₃SnH: 75% Et₃SiH | 30 | 28 | — | — | 300 | 56 | — | — |
| 25% n-Bu₃SnH: 75% Et₃SiH | 80 | 15 | — | — | 300 | 88 | — | — |

TABLE 12

Reactivity of $WOCl_2(OC_6H_3-2,6-Cl_2)_2$ with Different Ratios of Tri-n-Butyltin Hydride and Triethylsilane

| Activator | Initial Temp. (°C.) | $t_{gel}$ (sec) | $t_{100°C}$ (sec) | $t_{180°C}$ (sec) | $tT_{max}$ (sec) | $T_{max}$ (°C.) | Swell (%) | Residual Monomer (%) |
|---|---|---|---|---|---|---|---|---|
| 75% n-Bu₃SnH: 25% Et₃SiH | 30 | 10 | 29 | 33 | 52 | 210 | 83.9 | 0.07 |
| 75% n-Bu₃SnH; 25% Et₃SiH | 80 | 9 | 19 | 23 | 39 | 218 | 94.3 | 0.19 |
| 50% n-Bu₃SnH: 50% Et₃SiH | 30 | 12 | 46 | 51 | 68 | 199 | 82.7 | 0.05 |
| 50% n-Bu₃SnH: 50% Et₃SiH | 80 | 10 | 22 | 27 | 44 | 217 | 90.8 | 0.18 |
| 25% n-Bu₃SnH: 75% Et₃SiH | 30 | 19 | 102 | 109 | 120 | 202 | 90.2 | 0.3 |
| 25% n-Bu₃SnH: 75% Et₃SiH | 80 | 16 | 39 | 44 | 59 | 213 | 83.9 | 0.98 |

EXAMPLES 17-18

$WOCl_2(OAr)$, catalysts were prepared in accordance with analogous procedures to those disclosed in Example 3, substituting the appropriate phenol for that disclosed in Example 3. The results of polymerization with these catalysts is shown in Table 13.

$WOCl_3(OAr)$ catalysts were prepared in accordance with analogous procedures to those disclosed in Example 2. The results of polymerization with these catalysts is shown in Table 14.

EXAMPLE 19

In examining the synthesis of $WOCl_2(OC_6H_3-2,6-i-Pr_2)_2$(Example 1), it was found that $WOCl(OC_6H_3-2,6-i-Pr_2)_3$ can be generated in the reaction pot at ambient temperature. Pure $WOCl(OC_6H_3-2,6-i-Pr_2)_3$ can only be synthesized by the addition of one mol. equivalent of lithium 2,6-di-isopropylphenoxide in diethyl ether at −30° C. At 80° C., $WOCl(OC_6H_3-2,6-i-Pr_2)_3$ can be activated by tri-n-butyltin hydride (n-Bu₃SnH) to generate a polymerizing species (Table 15). No polymerization exotherm was observed at room temperature. The 2,6 dichlorophenol analog to the above 2,6-dichlorophenol substituted tungsten compound $WOCl(OC_6H_3-2,6-Cl_2)_3$, was found to be much more easily activated by n-Bu$_3$SnH, so polyDCPD was formed at room temperature as well as at more typical molding temperatures.

TABLE 13

| Catalyst | Initial Temp. (°C.) | $t_{gel}$ (sec) | $t_{100°\ C.}$ (sec) | $t_{180°\ C.}$ (sec) | $tT_{max}$ (sec) | $T_{max}$ (°C.) | Swell (%) | Residual Monomer (%) |
|---|---|---|---|---|---|---|---|---|
| $WOCl_2(OC_6H_2\text{-}2,4\text{-}Cl_2\text{-}6\text{-}Me)_2$ | 31 | 11 | 24 | 33 | 51 | 196 | 64.2 | 0.44 |
| $WOCl_2(OC_6H_2\text{-}2,4\text{-}Cl_2\text{-}6\text{-}Me)_2$ | 80 | 10 | 21 | 26 | 41 | 209 | 75.1 | 0.66 |
| $WOCl_2(OC_6H_3\text{-}2,6\text{-}Ph_2)_2$ | 30 | 15 | 38 | 43 | 60 | 203 | 121.3 | 0.16 |
| $WOCl_2(OC_6H_3\text{-}2,6\text{-}Ph_2)_2$ | 80 | 11 | 21 | 27 | 39 | 202 | 137.9 | 0.29 |

The above polymerizations were run at the following ratios:
DCPD: W: DG: Sn: TBP
2000: 1: 2: 3: 3

TABLE 14

| Catalyst | Initial Temp. (°C.) | $t_{gel}$ (sec) | $t_{100°\ C.}$ (sec) | $t_{180°\ C.}$ (sec) | $tT_{max}$ (sec) | $T_{max}$ (°C.) | Swell (%) | Residual Monomer (%) |
|---|---|---|---|---|---|---|---|---|
| $WOCl_3(OC_6H_3\text{-}2,6\text{-}Br_2)$ | 30 | 5 | 15 | 22 | 40 | 205 | 72.5 | 0.10 |
| $WOCl_3(OC_6H_3\text{-}2,6\text{-}Br_2)$ | 80 | 4 | 12 | 18 | 36 | 209 | 79.9 | 0.23 |
| $WOCl_3(OC_6H_3\text{-}2,6\text{-}OMe_2)$ | 31 | 40 | 84 | 89 | 105 | 208 | 68.5 | 0.28 |
| $WOCl_3(OC_6H_3\text{-}2,6\text{-}OMe_2)$ | 80 | 15 | 23 | 30 | 46 | 218 | 86.2 | 0.58 |

The above polymerizations were run at the following ratios:
DCPD: W: DG: Sn: TBP
2000: 1: 2: 3: 3

TABLE 15

Polymerization Data for $WOCl(OAr)_3$/n-Bu$_3$SnH Mixtures: Effect of Temperature and Rate Moderator

| $WOCl(OAr)_3$ Catalyst | W:Sn:TBP | Initial Temp. (°C.) | $t_{gel}$ (Sec) | $t_{100°\ C.}$ (sec) | $t_{180°\ C.}$ (sec) | $tT_{max}$ (sec) | $T_{max}$ (°C.) |
|---|---|---|---|---|---|---|---|
| $WOCl(OC_6H_3\text{-}2,6\text{-}i\text{-}Pr_2)_3$ | 1:3:0 | 31 | 1 | no polymerization at 420s | | | |
| $WOCl(OC_6H_3\text{-}2,6\text{-}i\text{-}Pr_2)_3$ | 1:3:0 | 80 | 1 | 224 | 231 | 243 | 214 |
| $WOCl(OC_6H_3\text{-}2,6\text{-}i\text{-}Pr_2)_3$ | 1:3:0 | 80 | 1 | 211 | 219 | 239 | 225 |
| $WOCl(OC_6H_3\text{-}2,6\text{-}Cl_2)_3$ | 1:3:0 | 31 | 1 | 23 | 27 | 42 | 205 |
| $WOCl(OC_6H_3\text{-}2,6\text{-}Cl_2)_3$ | 1:3:0 | 31 | 1 | 29 | 37 | 53 | 206 |
| $WOCl(OC_6H_3\text{-}2,6\text{-}Cl_2)_3$ | 1:3:0 | 80 | 1 | 21 | 29 | 41 | 201 |
| $WOCl(OC_6H_3\text{-}2,6\text{-}Cl_2)_3$ | 1:3:0 | 80 | 1 | 22 | 29 | 42 | 194 |
| $WOCl(OC_6H_3\text{-}2,6\text{-}i\text{-}Pr_2)_3$ | 1:3:3 | 80 | 11 | 96 | 105 | 115 | 214 |
| $WOCl(OC_6H_3\text{-}2,6\text{-}i\text{-}Pr_2)_3$ | 1:3:3 | 80 | 13 | 87 | 93 | 107 | 221 |
| $WOCl(OC_6H_3\text{-}2,6\text{-}i\text{-}Pr_2)_3$ | 1:3:3 | 80 | 13 | 85 | 92 | 109 | 223 |
| $WOCl(OC_6H_3\text{-}2,6\text{-}Cl_2)_3$ | 1:3:3 | 31 | 8 | 59 | 66 | 78 | 199 |
| $WOCl(OC_6H_3\text{-}2,6\text{-}Cl_2)_3$ | 1:3:3 | 31 | 8 | 60 | 64 | 82 | 208 |
| $WOCl(OC_6H_3\text{-}2,6\text{-}Cl_2)_3$ | 1:3:3 | 80 | 7 | 28 | 31 | 46 | 219 |
| $WOCl(OC_6H_3\text{-}2,6\text{-}Cl_2)_3$ | 1:3:3 | 80 | 7 | 28 | 32 | 47 | 214 |

Overall reaction ratio DCPD:W procatalyst:diglyme:n-Bu$_3$SnH = 2000:1:2:3)

EXAMPLE 20

In this example, the tungsten catalyst compositions of Examples 1-4 were used to mold 98-99% pure DCPD in combination with tri-n-butyltin hydride, moderated by tributylphosphite in a 3.5% Royalene 301T (ethylene-propylene diene monomer (EPDM)) rubberized formulation. When the catalyst of Example 1 was used, parts were produced with 1.2 % residual monomer. The reaction ratio was DCPD:W:DG:n-Bu$_3$SnH:TBP = 2000:1:2:3:2. The properties were comparable to prior art formulations, except that the heat distortion temperature (HDT) was significantly higher than has been found except when a quantity of tricyclopentadiene or some other monomers were added to the DCPD monomer. The HDT was found to be about 117°-118° C., more than 15° C. than the control. The addition of the antioxidant Irganox 1035 did not affect the Notched Izod value, but reduced the heat distortion temperature by about 6° C. The addition of 10% of tricyclopentadiene (Cp-trimer) to the formulation resulted in a further 8° C. boost in HDT. More importantly, the Notched Izod value remained high compared to prior art compositions, even after aging. A sample of this rubberized material, containing no antioxidant, was aged at 70° C. and the change in Notched Izod as a function of time was recorded. After four days, the Notched Izod had plateaued at about 5.0 ft. lb./in. as compared to prior art material which had a Notched Izod value of about 2.5 ft lb/in after aging.

A pure tungsten catalyst having the formula $WOCl_2(OC_6H_3-2,6-Cl_2)_2$ was prepared in accordance with the procedure of Example 3 and when activated by tri-n-butyltin hydride an extremely active catalyst solution was produced for the polymerization of dicyclopentadiene. At 80/60° C. molding temperatures, a 3.5% Royalene 301T rubberized DCPD solution (DCPD:W:Sn=2000:1:3) was polymerized by $WOCl_2(OC_6H_3-2,6-CL_{2,6}-Cl_2)_2$ (stabilized by two molar equivalents of diglyme) in combination with n-Bu$_3$SnH (moderated by two equivalents of tributylphosphite (TBP)) to yield poly(DCPD) containing only 0.37% residual DCPD and having a high heat distortion temperature of 118° C.

$WOCl_3(OC_6-2,6-Cl_2)$ was prepared in accordance with the procedure of Example 2. The catalyst system produced was very fast in gelling and curing DCPD.

For example, at proportions of DCPD:W:DG:n-Bu₃SnH:TBP of 2000:1:2:3:3 at 30° C., $t_{gel}$ was less than 1 second, $t_{100° C.}$ was 4 seconds and $t_{180° C.}$ was 10 seconds. It was found possible to prepare polyDCPD plaques having very low levels of residual monomer (0.28%) and excellent properties (Table 13). The heat distortion temperature of 123° C. is a very high level. Table 16 shows the properties of parts molded in accordance with the above description.

TABLE 16

| Sample | Modulus (Kpsi) | Tensile Strength (Kpsi) | Elongation (%) | Flex Modulus (Kpsi) | Strength (Kpsi) | Notched Izod (ftlb/in) | HDT (264 psi) (°C.) | Residual Monomer (wt %) | Tg (DMA) (°C.) |
|---|---|---|---|---|---|---|---|---|---|
| Example 1 Catalyst (2 eq. DG/2 eq. TBP) | 249.0 | 5.5 | 28.0 | 277.4 | 9.8 | 11.7 | 117 | 1.2 | 154 |
| Example 1 Catalyst (2 eq. DG/2 eq. TBP) 2% Irganox 1035 | — | — | — | — | — | 11.7 | 111 | 0.86 | — |
| Example 1 Catalyst (2 eq. DG/2 eq. TBP) 10% Cp-trimer Monomer | 237.6 | 5.9 | 37.9 | 283.1 | 9.8 | 7.6 | 125 | 1.3 | 165 |
| Example 3 Catalyst (2 eq. DG/2 eq. TBP) | 237.6 | 5.9 | 37.1 | 252.0 | 8.9 | 9.1 | 118 | 0.38 | 148 |
| Example 3 Catalyst (2 eq. DG/2 eq. TBP) | 250.4 | 6.7 | 66.6 | 280.3 | 10.0 | 9.1 | 123 | 0.28 | 146 |

In all cases, reaction ratio used is DCPD:W:Sn = 2000:1:3.
Diglyme (DG) is added as a catalyst stabilizer. Tributylphosphite (TBP) is added as a rate modifier.

We claim:

1. A catalyst composition comprising (a) a tungsten compound represented by the formula $WOX_{4-x}(OAr)_x$, wherein X is selected from the group consisting of chlorine, bromine and fluorine; x is 1, 2, or 3 and Ar is a mono-, di-, tri-, tetra-, or penta-substituted phenyl ring with substituents selected from the group consisting of nitro, cyano, aldehyde, carboxy, hydroxymethyl, alkoxy, alkylthio, arylthio, acyl, aroyl, acyloxy, alkoxycarbonyl, cycloalkane, dialkylamino, diarylamino, alkyl sulfonyl, aryl sulfonyl, alkyl sulfonate, aryl sulfonate, aryl, aralkyl, aryloxy, alkyl groups containing 8-20 carbon atoms, and allyl group and (b) a catalyst activator selected from the group consisting of trialklyaluminums, dialkylaluminum halides, alkylaluminum dihalides, dialkyl(alkoxy)aluminums, alkyl(alkoxy)aluminum halides, dialkylzines, alkylzine halides, diarylzines, arylzin halides, alkylsilanes, tetraalkyltins, trialkyltin hydrides, dialkyltin dihydrides, triaryltin hydrides, tetraalkylleads, trialkyllead hydrides, dialkyllead dihydrides, triaryllead hydrides, and mixtures thereof.

2. The catalyst composition of claim 1, wherein X is chlorine.

3. The catalyst composition of claim 1 wherein said substituent is selected from the group consisting of cyclohexyl, octyl, nonyl, phenyl, bromo, chloro, fluoro, ethoxy, methoxy, cyclopropane, methylsulfonyl, and benzyl groups.

4. The catalyst composition of claim 2 wherein said substituents are located at one or more positions on said phenyl ring wherein said positions are selected from the group consisting of the 2 position, the 3 position, the 4 position, the 2,6 positions, the 2,5 positions, the 2,4 positions, the 2,3 positions, the 3,4 positions, the 3,5 positions, the 2,4,6 position, the 2,3,4 positions, the 2,3,5 positions, the 2,3,6 positions, the 2,4,5 positions, the 3,4,5 positions, the 2,3,5,6 positions, the 2,3,4,5 positions and the 2,3,4,5,6 positions.

5. The catalyst composition of claim 1 further comprising a stabilizer compound.

6. The catalyst composition of claim 5 wherein said stabilizer compound is a Lewis base.

7. The catalyst composition of claim 5 wherein said stabilizer compound is selected from the group consisting of diethyl ether; ethylene glycol dimethyl ether, 2-methoxy ethyl ether, triethylene glycol dimethyl ether, tetraethylene glycol dimethyl ether, benzonitrile, acetonitrile, tetrahydrofuran, phenols having one aromatic ring, bisphenols having two aromatic rings, polyphenols having more than two aromatic rings and mixtures thereof.

8. The catalyst composition of claim 7 wherein said stabilizer is 2 methoxyethyl ether.

9. The catalyst composition of claim 7 wherein said phenol is selected from the group consisting of 2,6-di-t-butyl-4-methylphenol and 2,6-di-tert-butyl-4-secbutyl-phenol; said bisphenols are selected from the group consisting of 4,4'-methylenebis(2,6-dimethylphenol), 4,4'-methylenebis (2,6-di-tert-butylphenol); 2,2'-methylenebis(4-ethyl-6-butylphenol); 2,2'-ethylenebis(4,6-di-tert-butylphenol); 2,2'-methylenebis(4-ethyl-6-(1-methylcyclohexyl)phenol; 4,4'-butylidenebis(6-tert-butyl-3-methylphenol); 4,4'-thiobis(6-tert-butyl-3-methylphenol); 1,1'-thiobis(2-naphthol); 2,2'-thiobis (4-methyl-6-tert-butylphenol); 2,2'-isobutylidenebis(4,6-dimethylphenol); and 2,2'-methylenebis(4-methyl-6-cyclohexyl)phenol) and said polyphenols are selected from the group consisting of 1,3,5-trimethyl-2,4,6-tris(3,5-di-t-butyl-4-hydroxybenzene)benzene; sterically hindered polynuclear phenols and a butylated reaction product of p-cresol and dicyclopentadiene.

10. The catalyst composition of claim 1 wherein said catalyst is effective in polymerization of dicyclopentadiene at concentrations of monomer to catalyst of 4000:1 and lower.

11. A catalyst composition comprising (a) a tungsten compound represented by the formula $WOX_{4-x}(OAr)_x$, wherein X is selected from the group consisting of chlorine, bromine and fluorine; x is 1, 2, or 3 and Ar is a mono-, di-, tri-, tetra-, or penta-substituted phenyl ring, and (b) a catalyst activator selected from the group consisting of trialklyaluminum, dialkylaluminum halides, alkylaluminum dihalides, dialkyl(alkoxy)aluminums, alkyl(alkoxy)aluminum halides, dialkylzinc, alkylzinc halides, diarylzinc, arylzinc halides, alkylsilanes, tetraalkyltins, trialkyltin hydrides, dialkyltin dihydrides, triaryltin hydrides, tetraalkylleads, trialkyllead hydrides, dialkyllead dihydrides, triaryllead hydrides, and mixture thereof, wherein the phenyl ring is substituted with substituents that are not identical on a particular phenyl ring.

12. The catalyst composition of claim 11 wherein the substituents comprise at least one halogen atom and at least one 1-20 carbon alkyl group.

13. The catalyst composition of claim 12 wherein the alkyl group is an octyl or nonyl group.

14. The catalyst composition of claim 11 which additionally comprises a stabilizer compound.

15. The catalyst composition of claim 14 wherein the stabilizer compound is 2-methoxyethyl ether.

16. The catalyst composition of claim 1 wherein the catalyst activator is selected from the group consisting of ethylaluminum dichloride, diethylaluminum chloride, triethylaluminum, diethylzinc, dibutylzinc, ethyl-n-propoxyaluminum chloride, diphenylzinc, tributyltin hydride, trioctyltin hydride, diphenyltin dihydride and triphenyltin hydride.

17. The catalyst composition of claim 16 wherein the catalyst activator is triphenyltin hydride or tributyltin hydride.

* * * * *

UNITED STATES PATENT AND TRADEMARK OFFICE
CERTIFICATE OF CORRECTION

PATENT NO. : 5,298,471
DATED : March 29, 1994
INVENTOR(S) : Andrew Bell It is certified that error appears in the above-identified patent and that said Letters Patent is hereby corrected as shown below:

In Col. 21, line 44, claim 1, delete "dialkylzines" and substitute it with "dialkylzincs".
In Col. 21, line 44, claim 1, delete "alkylzine" and substitute it with "alkylzinc".
In Col. 21, lines 44-45, claim 1, delete "diarylzines" and substitute it with "diarylzincs".
In Col. 21, line 45, claim 1, delete "arylzin" and substitute it with "arylzinc".

In Col. 22, line 61, claim 11, delete "trialkylaluminum" and substitute it with "trialkylaluminums".

Signed and Sealed this

Twenty-sixth Day of July, 1994

*Attest:*

BRUCE LEHMAN

*Attesting Officer*    *Commissioner of Patents and Trademarks*